United States Patent
Zhang et al.

(10) Patent No.: US 9,363,648 B2
(45) Date of Patent: Jun. 7, 2016

(54) METHOD AND SYSTEM FOR DETERMINING THE EXISTENCE OF BROADCAST AND MULTICAST FRAMES BUFFERED IN AN ACCESS POINT

(71) Applicant: Huawei Technologies Co., Ltd., Shenzhen (CN)

(72) Inventors: Huimin Zhang, Shenzhen (CN); Liangyao Mo, Shenzhen (CH)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/573,574

(22) Filed: Dec. 17, 2014

(65) Prior Publication Data
US 2015/0103727 A1 Apr. 16, 2015

Related U.S. Application Data

(63) Continuation of application No. 13/342,747, filed on Jan. 3, 2012, now Pat. No. 8,953,598, which is a continuation of application No. 12/489,083, filed on Jun. 22, 2009, now Pat. No. 8,144,707, which is a continuation of application No. PCT/CN2008/070091, filed on Jan. 11, 2008.

(30) Foreign Application Priority Data

Jan. 12, 2007 (CN) .......................... 2007 1 0007853

(51) Int. Cl.
| | |
|---|---|
| H04H 20/71 | (2008.01) |
| H04W 4/06 | (2009.01) |
| H04L 12/18 | (2006.01) |
| H04W 76/04 | (2009.01) |
| H04W 52/02 | (2009.01) |

(Continued)

(52) U.S. Cl.
CPC .............. *H04W 4/06* (2013.01); *H04L 12/1854* (2013.01); *H04W 52/0229* (2013.01); *H04W 76/048* (2013.01); *H04W 48/12* (2013.01); *H04W 76/002* (2013.01)

(58) Field of Classification Search
None
See application file for complete search history.

(56) References Cited

U.S. PATENT DOCUMENTS

| | | | |
|---|---|---|---|
| 6,262,982 | B1 | 7/2001 | Donahue et al. |
| 6,266,339 | B1 | 7/2001 | Donahue et al. |

(Continued)

FOREIGN PATENT DOCUMENTS

| | | |
|---|---|---|
| CN | 1476259 A | 2/2004 |
| CN | 1738216 A | 2/2006 |

(Continued)

OTHER PUBLICATIONS

Stephenson et al., "Multiple SSID Support" Document: IEEE 802.11-06/1473r3—Slide Show Presentation, Mar. 12, 2007.

(Continued)

*Primary Examiner* — Nicholas Sloms
(74) *Attorney, Agent, or Firm* — Brinks Gilson & Lione

(57) ABSTRACT

A method includes: an AP sets a broadcast/multicast indication bit that associates the service network and/or multicast group to the valid state and sends frames that carry the broadcast/multicast indication bit to a STA; the STA determines whether there is broadcast/multicast frame buffered in the AP according to the associated service network and/or multicast group and the received broadcast/multicast indication bit.

12 Claims, 6 Drawing Sheets

(51) Int. Cl.
*H04W 48/12* (2009.01)
*H04W 76/00* (2009.01)

(56) References Cited

U.S. PATENT DOCUMENTS

| | | |
|---|---|---|
| 6,522,650 B1 | 2/2003 | Yonge et al. |
| 6,577,630 B1 | 6/2003 | Markwalter et al. |
| 6,671,284 B1 | 12/2003 | Yonge, III et al. |
| 6,674,738 B1 | 1/2004 | Yildiz et al. |
| 6,907,044 B1 | 6/2005 | Yonge et al. |
| 6,909,723 B1 | 6/2005 | Yonge et al. |
| 6,965,593 B2 | 11/2005 | Donahue et al. |
| 6,987,770 B1 | 1/2006 | Yonge, III |
| 7,174,161 B2 | 2/2007 | Nakajima et al. |
| 7,298,691 B1 | 11/2007 | Yonge et al. |
| 7,301,914 B2 | 11/2007 | Segal et al. |
| 7,385,945 B1 | 6/2008 | Olson et al. |
| 7,424,007 B2 | 9/2008 | Meier et al. |
| 7,433,669 B2 | 10/2008 | Rue |
| 7,450,933 B2 | 11/2008 | Kwal et al. |
| 7,535,884 B2 | 5/2009 | Stephenson et al. |
| 7,656,831 B2 | 2/2010 | Gao et al. |
| 7,698,550 B2 | 4/2010 | Abishek et al. |
| 7,813,307 B2 | 10/2010 | Kakani |
| 7,865,196 B2 | 1/2011 | Stahl et al. |
| 7,869,412 B2 | 1/2011 | Meier |
| 7,885,217 B2 | 2/2011 | Iyer et al. |
| 7,894,429 B2 | 2/2011 | Sim et al. |
| 7,898,996 B2 | 3/2011 | Sim et al. |
| 8,040,885 B2 | 10/2011 | Sim et al. |
| 8,072,993 B2 | 12/2011 | Wentink et al. |
| 8,144,704 B2 | 3/2012 | Miyajima et al. |
| 8,144,707 B2 | 3/2012 | Zhang et al. |
| 8,274,894 B2 | 9/2012 | Kneckt et al. |
| 8,345,647 B2 | 1/2013 | Jokela et al. |
| 8,477,674 B2 | 7/2013 | Kneckt et al. |
| 2004/0229606 A1 | 11/2004 | Oshima et al. |
| 2005/0009512 A1* | 1/2005 | Rue ............ H04L 12/12 455/420 |
| 2005/0037802 A1 | 2/2005 | Nakajima et al. |
| 2005/0122927 A1 | 6/2005 | Wentink |
| 2005/0138451 A1 | 6/2005 | Simpson et al. |
| 2005/0254444 A1 | 11/2005 | Meier et al. |
| 2005/0276237 A1 | 12/2005 | Segal |
| 2006/0039345 A1 | 2/2006 | Perez-Costa |
| 2006/0104225 A1 | 5/2006 | Kim et al. |
| 2006/0128433 A1 | 6/2006 | Liang et al. |
| 2006/0142004 A1 | 6/2006 | He et al. |
| 2006/0187864 A1 | 8/2006 | Wang et al. |
| 2006/0251099 A1 | 11/2006 | Kim et al. |
| 2006/0285507 A1* | 12/2006 | Kinder ............ H04W 48/12 370/310 |
| 2006/0285527 A1 | 12/2006 | Gao et al. |
| 2006/0285528 A1 | 12/2006 | Gao et al. |
| 2007/0127478 A1 | 6/2007 | Jokela et al. |
| 2007/0133448 A1 | 6/2007 | Gao et al. |
| 2007/0206517 A1 | 9/2007 | Kakani |
| 2007/0223494 A1 | 9/2007 | Hyyrynen et al. |
| 2007/0242645 A1 | 10/2007 | Stephenson et al. |
| 2007/0258466 A1 | 11/2007 | Kakani |
| 2007/0286121 A1 | 12/2007 | Kolakowski et al. |
| 2008/0002616 A1 | 1/2008 | Stahl et al. |
| 2008/0014949 A1 | 1/2008 | Sinnarajah et al. |
| 2008/0049703 A1 | 2/2008 | Kneckt et al. |
| 2008/0123577 A1* | 5/2008 | Jaakkola ............ H04W 52/0225 370/311 |
| 2008/0151814 A1 | 6/2008 | Jokela |
| 2008/0170519 A1 | 7/2008 | Sim et al. |
| 2008/0170520 A1 | 7/2008 | Sim et al. |
| 2008/0181156 A1 | 7/2008 | Ecclesine |
| 2008/0219192 A1 | 9/2008 | Sim et al. |
| 2008/0232373 A1 | 9/2008 | Iyer et al. |
| 2008/0233974 A1 | 9/2008 | Xu |
| 2009/0046682 A1 | 2/2009 | Kim et al. |
| 2009/0097428 A1 | 4/2009 | Kneckt et al. |
| 2009/0225731 A1 | 9/2009 | Kneckt et al. |
| 2009/0232042 A1 | 9/2009 | Kneckt et al. |
| 2009/0252165 A1 | 10/2009 | Zhang et al. |
| 2009/0268652 A1 | 10/2009 | Kneckt et al. |
| 2009/0279449 A1 | 11/2009 | Kneckt et al. |
| 2009/0303910 A1 | 12/2009 | Sun et al. |
| 2010/0189021 A1 | 7/2010 | He et al. |
| 2010/0234071 A1 | 9/2010 | Shabtay et al. |
| 2012/0099507 A1 | 4/2012 | Zhang et al. |
| 2012/0106452 A1 | 5/2012 | Kneckt et al. |
| 2012/0320755 A1 | 12/2012 | Seok et al. |
| 2013/0229959 A1 | 9/2013 | Ghosh et al. |
| 2013/0235773 A1 | 9/2013 | Wang et al. |
| 2014/0010152 A1 | 1/2014 | Park |
| 2014/0056232 A1 | 2/2014 | Park |
| 2014/0071900 A1 | 3/2014 | Park |

FOREIGN PATENT DOCUMENTS

| | | |
|---|---|---|
| CN | 1791260 A | 6/2006 |
| CN | 1852112 A | 10/2006 |
| CN | 1866889 A | 11/2006 |
| CN | 1894731 A | 1/2007 |
| CN | 101222388 A | 7/2008 |
| WO | WO 2005/064952 A1 | 7/2005 |

OTHER PUBLICATIONS

LAN/MAN Committee, "Part 11: Wireless LAN Medium Access Control (MAC) and Physical Layer (PHY) Specifications" Draft Standard for Information Technolog—Telecommunications and Information Exchange Between Systems—Local and Metropolitan Area Networks—Specific Requirements. IEEE P802.11-REVma™/D8.02006.

IEEE 802 Committee, "Part 11: Wireless Medium Access Control (MAC) and Physical Layer (PHY) Specifications" Amendment v: Wireless Network Management. Draft Amendment to Standard for Information Technology—Telecommunications and Information Exchange Between Systems—LAN/MAN Specific Requirements. IEEE P802.11v/D0.04, Jul. 2006.

* cited by examiner

METHOD AND SYSTEM FOR DETERMINING THE EXISTENCE OF BROADCAST AND MULTICAST FRAMES BUFFERED IN AN ACCESS POINT

CROSS-REFERENCE TO RELATED APPLICATIONS

This application is a continuation of U.S. patent application Ser. No. 13/342,747, filed on Jan. 3, 2012, which is a continuation of U.S. patent application Ser. No. 12/489,083, filed on Jun. 22, 2009; the U.S. application Ser. No. 12/489,083 is a continuation of International Application No. PCT/CN2008/070091, filed on Jan. 11, 2008, titled "Method and System for Determining whether Access Point Exists in Broadcast/Multicast Buffered Frame", which claims the priority of Chinese Patent Application No. 200710007853.8, filed on Jan. 12, 2007, titled "Method and System for Determining the Existence of Broadcast and Multicast Frames Buffered in an Access Point", the entire contents of all of which are incorporated herein by reference.

FIELD OF THE DISCLOSURE

The present disclosure relates to communication technologies, and in particular, to a method and system for determining the existence of broadcast and multicast frames buffered in an access point (AP).

BACKGROUND

Wireless LAN (WLAN) technology is very popular in the market due to its wireless advantages, high-speed access and low price comparable to wired access. WLAN technology has been replacing wired technologies, and is now applied in scenarios such as home, campus, hotel, and enterprise office. It is widely deployed in public hot spots as a wireless broadband access technology to provide public wireless broadband data access services. The following describes a WLAN system in detail by taking the WLAN system defined in IEEE 802.11 as an example.

FIG. 1 shows the basic structure of a WLAN system. The system includes: (i) stations (STAs), further including WLAN interfaces; (ii) access points (APs), equivalent to base stations in a mobile network and configured to establish communications between STAs or between STAs and relevant equipment in a wired network and between STAs and relevant equipment in a wired LAN. For example, multiple STAs access an AP to form a WLAN. An AP and a STA associated with an AP are called a basic service set (BSS). The AP may be configured with (see the AP and STA in BSS 2 shown in FIG. 1) or separated from the STA (see BSS1 shown in FIG. 1); and (iii) a distribution system (DS), configured to establish communications between different BSSs and between a BSS and a wired LAN. A logic point that forwards MAC service data units (MSDUs) between a DS and a wired LAN is called a portal.

The WLAN system is also called an extended service set (ESS).

In the WLAN system, a STA may work in a power saving (PS) mode, that is, the STA receives Beacon frames and processes the received control information only, but does not send any message to the AP. Generally, when no packet is sent, the STA may enter the PS mode (snooze status) and notify the AP to record the association ID (AID) and MAC address of the STA; when packets are sent to the STA in the PS mode, the AP may not send packets to the STA directly, but buffer the packets and notify the STA to take the packets through the Beacon frame. The STA in the PS mode intercepts the Beacon frame periodically. After detecting that a packet is buffered in the AP, the STA wakes up and sends a short Power Supply Poll (PS-Poll) frame to the AP; the AP sends the buffered data immediately or after responding to the PS-Poll frame. If all the STAs in the BSS work in the PS mode, the AP may buffer all the broadcast frames and multicast frames and send them to the STAs during the transmission of delivery traffic indication message (DTIM) frames.

A Beacon frame includes a traffic indication message (TIM) information domain, which is configured to indicate whether a STA in the PS mode has frames buffered in an AP. As shown in FIG. 2, the TIM information domain includes an Element ID, a Length, a DTIM Count, a DTIM Period, a Bitmap Control, and a Partial Virtual Bitmap. Each of the Element ID, Length, DTIM Count, DTIM Period, and Bitmap Control occupies one byte. The Partial Virtual Bitmap has variable lengths ranging from 1 to 251 bytes. The following describes components of the TIM information domain:

Length is configured to indicate the length of the TIM information domain unit.

DTIM Count is configured to indicate the number of Beacon frames to be transmitted before the next DTIM. If the DTIM Count is 0, the current TIM is a DTIM.

DTIM Period is configured to identify the number of Beacon frames between two successive DTIMs. If all the TIMs are DTIMs, the value of DTIM Period is 1. If the value of DTIM Period is 1, the DTIM Period is reserved.

The DTIM Count and DTIM Period are configured to notify the STA of the time when the broadcast/multicast frames buffered in an AP are sent and of the frequency of sending the broadcast and multicast frames.

Bitmap Control is configured to indicate whether broadcast/multicast frames are buffered in an AP by using the least significant bit. When one or more broadcast/multicast frames or multiple target frames are buffered in the AP, the least significant bit of the Bitmap Control domain is set to 1; when the DTIM Count domain is set to 0, the broadcast/multicast frames are sent. The remaining seven bits of the Bitmap Control domain are used as bit mapping offset values.

Partial Virtual Bitmap is configured to indicate whether the broadcast/multicast frames buffered in an AP are sent completely. The Partial Virtual Bitmap may be 251 bytes at most. When each bit associates a STA, the Partial Virtual Bitmap may associate 2008 STAs. The zero bit of the Partial Virtual Bitmap is reserved by the AP. When any of the other bits of the Partial Virtual Bitmap is set to 1, the STA associating the bit has unicast data buffered in the AP.

As shown in FIG. 2, in the TIM information domain of the Beacon frame, only the least significant bit of the Bitmap Control domain indicates whether there are broadcast/multicast frames. Thus, the Bitmap Control domain cannot indicate which multicast group the broadcast/multicast frames come from. Besides, the Bitmap Control domain cannot indicate which service network the broadcast/multicast frames come from. Thus, when the AP is shared, all the STAs associated with the AP are wakened to receive the broadcast/multicast frames, no matter whether the broadcast/multicast frames belong to the STA. The STA is connected to a service network through an associated service set ID (SSID). The service network includes an external network and/or a local network, where the external network may be a subscribed service provider network or another external network. For the convenience of description, the SSID mentioned below refers to the corresponding service network.

When a virtual AP scheme is adopted to share the AP, that is, a physical AP is simulated into multiple virtual APs, and each virtual AP associates different basic SSIDs (BSSIDs) and has independent MAC management frames. STAs with different SSIDs may be associated with different virtual APs of a same physical AP.

In the virtual AP scheme, a BSSID associates an SSID correspondingly, and it may wake up the STA associated with the virtual AP, by sending a Beacon frame from each of the virtual AP. This, however, may increase the load of radio channels. Besides, when the SSID has multiple multicast sources, this method cannot specify the multicast source, that is, all the STAs that are associated with the SSID have to be wakened to receive multicast frames.

When multiple SSIDs are adopted to share the AP, different services or user groups may select different SSIDs. In this case, the AP must be configured with multiple SSIDs, each of which associates a user group or a service. Though the AP may differentiate a user group or a service according to the SSID, the AP cannot enable the STA that is associated with the SSID to determine whether there are broadcast/multicast frames buffered in the AP.

SUMMARY

An embodiment of the present disclosure provides a method and system for determining the existence of broadcast/multicast frames buffered in an access point (AP) so that a station (STA) can determine whether the buffered broadcast/multicast frames in the AP belong to the STA, thus avoid unnecessary wakening.

A method for determining the existence of broadcast/multicast frames buffered in an AP in an embodiment of the present disclosure includes: by the AP, when receiving broadcast/multicast frames from a service network and/or a multicast group, setting the broadcast/multicast indication bit that associates the service network and/or multicast group to the valid state and sending the frames that carry the broadcast/multicast indication bit to a STA; and determining, by the STA, whether there are broadcast/multicast frames buffered in the AP according to the associated service network and/or multicast group and the received broadcast/multicast indication bit.

A system for determining the existence of broadcast/multicast frames buffered in an AP in an embodiment of the present disclosure includes: a STA, configured to receive frames that carry the broadcast/multicast indication bit from an AP and determine whether there are broadcast/multicast frames buffered in the AP according to a associated service network and/or a multicast group and the received broadcast/multicast indication bit; and an AP, when receiving broadcast/multicast frames from the service network and/or multicast group, configured to set the broadcast/multicast indication bit that associates the service network and/or multicast group to the valid state and send the frames that carry the broadcast/multicast indication bit to a STA.

A STA provided in an embodiment of the present disclosure includes: a receiving unit, configured to receive frames that carry the broadcast/multicast indication bit from an AP; and a determining unit, configured to determine whether there are broadcast/multicast frames buffered in an AP according to the associated service network and/or multicast group and the received broadcast/multicast indication bit.

An AP provided in an embodiment of the present disclosure includes: a receiving unit, configured to receive broadcast/multicast frames from a service network and/or a multicast group and activate the setting unit; a setting unit, configured to set the broadcast/multicast indication bit that associates a service network and/or a multicast group to the valid state; and a sending unit, configured to send frames that carry the broadcast/multicast indication bit set by the setting unit to the STA.

A system for receiving broadcast/multicast frames buffered in an AP in an embodiment of the present disclosure includes: a STA, configured to receive frames that carry the broadcast/multicast indication bit from an AP, wake up according to the associated service network and/or multicast group, received broadcast/multicast indication bit and DTIM time, and receive broadcast/multicast frames buffered in the AP; and an AP, when receiving broadcast/multicast frames from a service network and/or a multicast group, configured to set the broadcast/multicast indication bit that associates the service network and/or multicast group to the valid state, set a DTIM time that associates the service network and/or multicast group according to the received broadcast/multicast frames, and send the frames that carry the broadcast/multicast indication bit to the STA.

According to embodiments of the present disclosure, each SSID and/or multicast group is allocated with an index value, and the index value associates the broadcast/multicast indication bit of the Partial Virtual Bitmap in the Beacon frame. In this way, the STA may know whether there are broadcast/multicast frames in the AP according to the index value and the broadcast/multicast indication bit of the Beacon frame, thus avoiding unnecessarily wakening the STA.

DETAILED DESCRIPTION OF THE EMBODIMENTS

For better understanding and implementation of the present disclosure, the present disclosure is hereinafter described in detail with reference to the accompanying drawing and preferred embodiments.

An embodiment of the present disclosure discloses a method for determining the existence of broadcast/multicast frames buffered in an AP. According to the embodiments of the present disclosure, the AP allocates an index value for each SSID and/or multicast group, where the index value associates the broadcast/multicast indication bit (that is, the index value is the location information of the broadcast/multicast indication bit) of the Partial Virtual Bitmap in the Beacon frame, and notifies the STA of the index value; the STA queries the broadcast/multicast indication bit in the Beacon frame according to the index value to know whether there are broadcast/multicast frames buffered in the AP. To determine when to receive the broadcast/multicast frames buffered in the AP, each SSID and/or multicast group uses the DTIM Count and DTIM Period to indicate when to send broadcast/multicast frames. The STA reads the DTIM Count and DTIM Period that associate the SSID and/or multicast and determines when to wake up to receive the buffered multicast frames.

The broadcast/multicast indication bit of Partial Virtual Bitmap in the Beacon frame may be the N bit to the N+M bit of the Partial Virtual Bitmap in the Beacon frame. The remaining bits are for allocation of unicast indication bit, which indicates whether the STA associating the bit has unicast data buffered in the AP. The N and N+M range from 1 to 2007, and M is a positive integer greater than or equal to 1. The AP may reserve values between 1 and 2007 for the allocation of broadcast/multicast indication bit according to the configuration.

Figure 1:
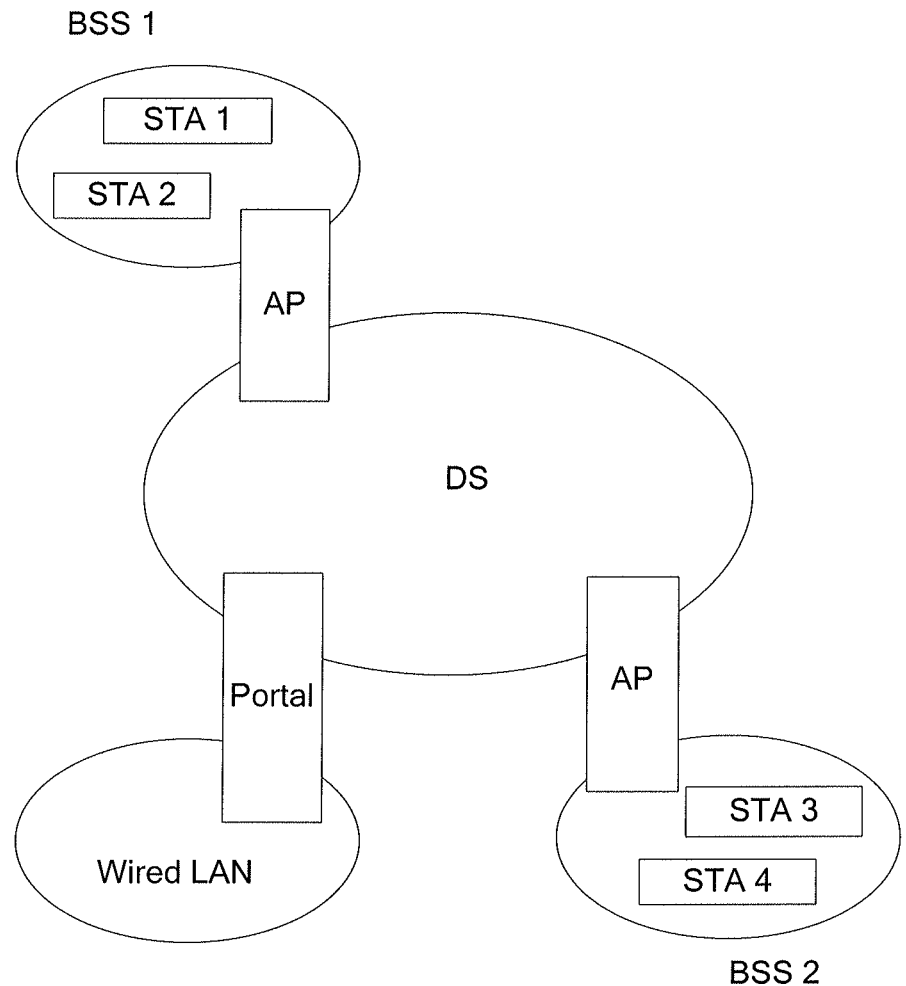
FIG. 1 shows a WLAN system defined in the IEEE 802.11.
Figure 2:
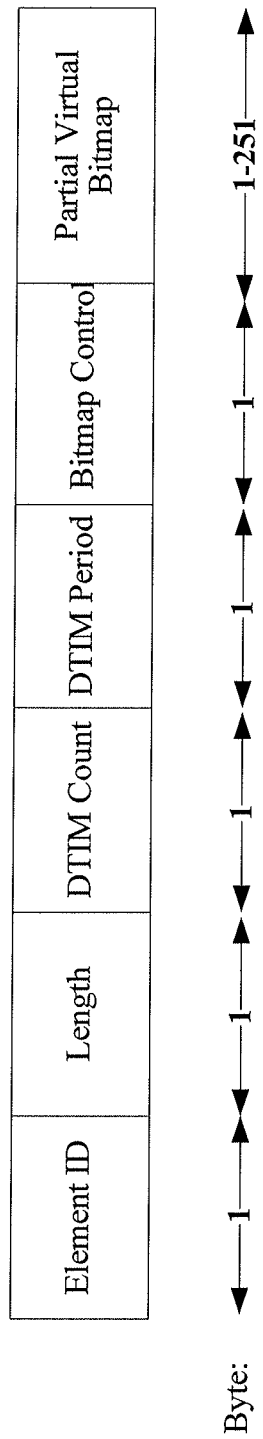
FIG. 2 shows the structure of the TIM information domain of the Beacon frame.
Figure 3:
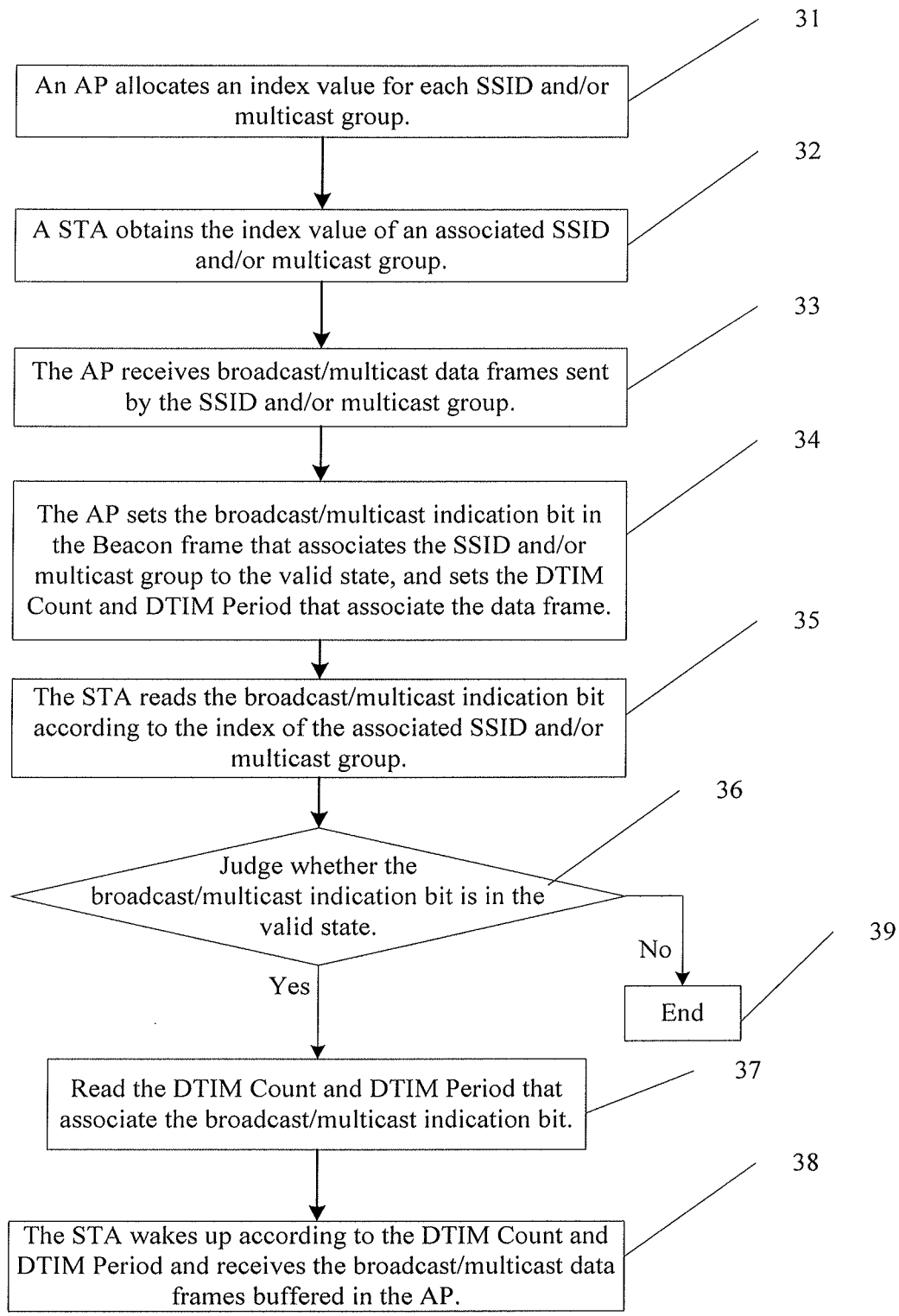
FIG. 3 shows the process of determining that there are broadcast/multicast frames buffered in an AP according to an embodiment of the present disclosure.

The following describes the method for determining the existence of broadcast/multicast frames buffered in an AP according to an embodiment of the present disclosure with reference to FIG. 3.

Step 31: An AP allocates an index value for each SSID and/or multicast group, with the index value associating the broadcast/multicast indication bit of the Partial Virtual Bitmap in the Beacon frame, so that the STA may read the broadcast/multicast indication bit according to the index value.

Step 32: The STA obtains the index of the associated SSID and/or multicast group.

Figure 4:
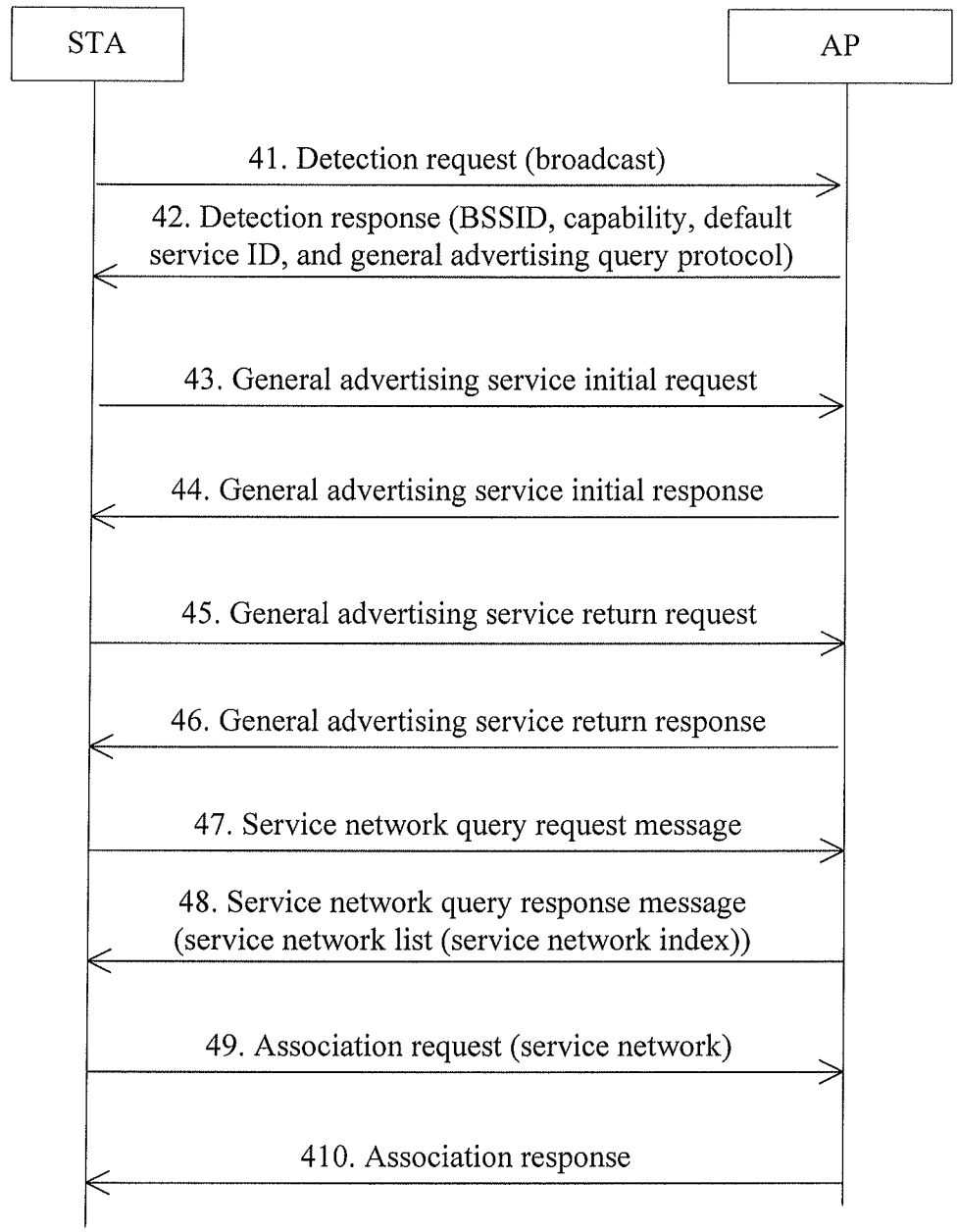
FIG. 4 shows the process of obtaining the index value of an SSID according to an embodiment of the present disclosure.

When the multiple-SSIDs technology is adopted to share the AP, the STA may obtain the index value of the SSID by using a multiple-SSIDs discovery process to query the SSID information. FIG. 4 shows the process of obtaining the index value of the SSID, which is hereinafter described.

Step 41 to Step 46: The STA queries a WLAN network and finds a subscribed service provider network (SSPN).

Step 47: The STA sends a service network query request message to the AP so that the AP queries the SSIDs supported.

The service network query request message may be a general advertising service initial request (GAS Initial Request) message.

Step 48: The AP returns a service network query response message to the STA, which includes a service network list for service network index values (SSID list).

The service network query response message may be a general advertising service initial response (GAS Initial Response) message.

Step 49 to Step 410: The STA selects an SSID for association and records the SSID index value so as to judge whether there are broadcast/multicast frames buffered in the AP by searching for the broadcast/multicast indication bit that associates the index value.

Table 1 shows the format of the SSID List information domain. The SSID List includes: an Element ID, configured to identify an information element; a Length, configured to indicate the length of the SSID List; and multiple SSIDC information elements. As shown in Table 2, each SSIDC information element includes: a robust security network information element (RSN IE), configured to indicate the security methods supported, and an Index, configured to indicate the broadcast/multicast indication bit of the Partial Virtual Bitmap in the Beacon frame.

TABLE 1

|  | Element ID | Length | SSIDC IE #1 | SSIDC IE #2 (Optional) | ... | SSIDC IE #N (Optional) |
|---|---|---|---|---|---|---|
| Octets: | 1 | 2 | variable | variable | ... | variable |

TABLE 2

|  | Element ID | Length | SSID IE | RSN IE (Optional) | Index |
|---|---|---|---|---|---|
| Octets: | 1 | 1 | variable | Variable | 1 |

Besides, the AP may send the service network query response message to the STA periodically to notify the STA of the service network index value related to the STA. In this case, the STA may find the broadcast/multicast indication bit according to the service network index value and judge whether there are broadcast/multicast frames buffered in the AP according to the broadcast/multicast indication bit.

Figure 5:
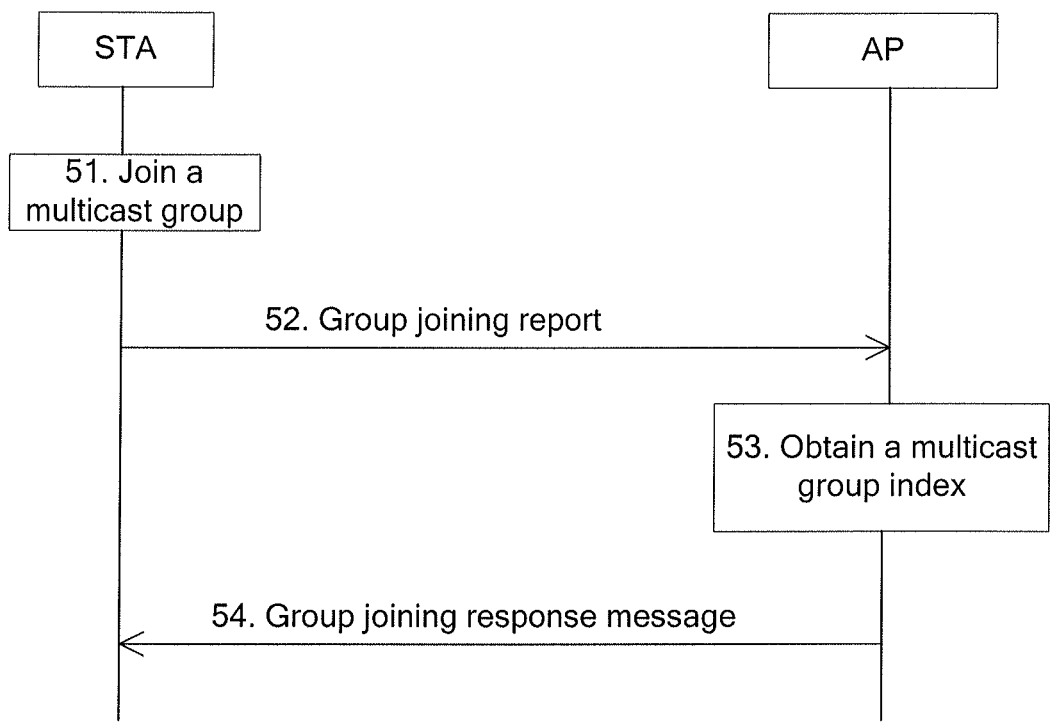
FIG. 5 shows the process of obtaining the index value of the multicast according to an embodiment of the present disclosure.

When the AP finds that the STA joins a multicast group, the AP may send the index value of the multicast group to the STA, with the index value associating the broadcast/multicast indication bit of the Partial Virtual Bitmap in the Beacon frame, so that the STA can read the correct broadcast/multicast indication bit according to the index value of the multicast group and further know whether there are broadcast/multicast frames buffered in the AP. FIG. 5 shows the process of obtaining the index value of the multicast group by the STA.

Step 51 to Step 52: After joining a multicast group, the STA sends a group joining report, which includes a multicast group ID and may be an IGMP report.

Step 53: The AP searches for the index value of the multicast group according to the multicast group ID in the group joining report. If the index value is found, the AP returns the index value; otherwise, the AP allocates an index value for the multicast group and returns the index value.

The AP may obtain the group joining report by using a snooping technology or from the STA directly.

Step 54: The AP sends a group response message carrying a multicast group index value to the STA.

The group joining response message may be a multicast index message or an extended authentication protocol over LAN key (EAPOL-Key).

Table 3 shows the format of the multicast index message.

TABLE 3

|  | Category | Action | Dialog Token | Index Element |
|---|---|---|---|---|
| Octets: | 1 | 1 | 1 | 1 |

Category is configured to indicate that a frame is an interworking service frame.

Action is configured to indicate that a frame is a multicast index frame (broadcast/multicast index frame).

Dialog Token is configured to indicate the dialog token.

Index Element is configured to indicate the index value that associates the multicast group. Table 4 shows the definition of the index element. As shown in Table 4, the multicast ID indicates the identifier of the multicast group, and may be the multicast MAC address. The index associates the multicast ID.

TABLE 4

| | Element ID | Length | Multicast ID | Index |
|---|---|---|---|---|
| Octets: | 1 | 1 | 6 | 1 |

Step 33: The AP receives a broadcast/multicast frame from the SSID and/or multicast group, that is, the broadcast/multicast frame comes from the SSID and/or multicast group.

Step 34: The AP sets the broadcast/multicast indication bit in the Beacon frame that associates the SSID and/or multicast group to the valid state, that is, when the AP receives the broadcast/multicast frame from the SSID, the AP sets the broadcast/multicast indication bit that associates the SSID to the valid state; when the AP receives the broadcast/multicast frame from the multicast group, the AP sets the broadcast/multicast indication bit that associates the multicast group to the valid state; when the AP receives the broadcast/multicast frame from the SSID and the multicast group, the AP sets the broadcast/multicast indication bit that associates the SSID and multicast group to the valid state. The AP sets the DTIM Count and DTIM Period that associate the broadcast/multicast frame to indicate the time sequence for the arrival of the broadcast/multicast frame, and sends the Beacon frame to the STA.

When the SSID has multiple multicast groups, upon receiving the broadcast/multicast frame of a multicast group in the SSID, the AP sets the broadcast/multicast indication bit of the multicast group only to the valid state.

In the embodiments of the present disclosure, a DTIM time may be set in the Beacon frame. The DTIM time includes a DTIM Count and a DTIM Period. Elements may be added to the Beacon, as shown in Table 5. In this case, the number of SSIDs and multicast groups may be equal to the number of elements shown in Table 5 in the system.

TABLE 5

| | Element ID | Length | Index | DTIM Count | DTIM Period |
|---|---|---|---|---|---|
| Octets: | 1 | 1 | 1 | 1 | 1 |

Index is configured to identify which SSID or multicast group the DTIM Count and DTIM Period belong to.

DTIM Count is configured to indicate the number of Beacon frames to be transmitted before the next DTIM. If the DTIM Count is 0, the current TIM is a DTIM.

DTIM Period is configured to identify the number of Beacon frames to be transmitted between two successive DTIMs. If all the TIMs are DTIM, the value of DTIM Period is 1. If the value of DTIM Period is 0, the DTIM Period is reserved.

The DTIM Count and DTIM Period are configured to notify the STA of the time when to send the broadcast/multicast frames that associate the SSID or multicast group buffered in the AP and the frequency of sending the broadcast/multicast frames.

To save the size of the Beacon frame, a DTIMs Indication Container IE may be defined to encapsulate the DTIM Counts and DTIMP Periods of all the SSIDs or multicast groups. As shown in Table 6, the DTIMs Indication Container IE includes N DTIM Indication messages that associate the SSID or multicast group, each of which further includes an index, a DTIM Count and a DTIM Period that associate the SSID or multicast group.

TABLE 6

| | Element ID | Length | DTIM Indication 1 | DTIM Indication 2 | ... | DTIM Indication M |
|---|---|---|---|---|---|---|
| Octets: | 1 | 1 | 3 | 3 | | 3 |

Step 35: The STA reads the broadcast/multicast indication bit according to the index value of the associated SSID or multicast group.

Step 36: The STA judges whether the broadcast/multicast indication bit is in the valid state. If yes, it indicates that there are broadcast/multicast frames in the AP. The STA executes Step 37; otherwise, it indicates that there are no broadcast/multicast frames in the AP. The STA executes Step 39 to end the process.

Step 37: When the broadcast/multicast indication bit is in the valid state, the STA continues reading the DTIM Count and DTIM Period that associate the broadcast/multicast indication bit to determine when to wake up to receive the broadcast/multicast frames.

Step 38: The STA wakes up according to the DTIM Count and the DTIM Period, and receives the broadcast/multicast frames buffered in the AP.

In the preceding steps, Step 32 must be executed before step 35.

Figure 6:
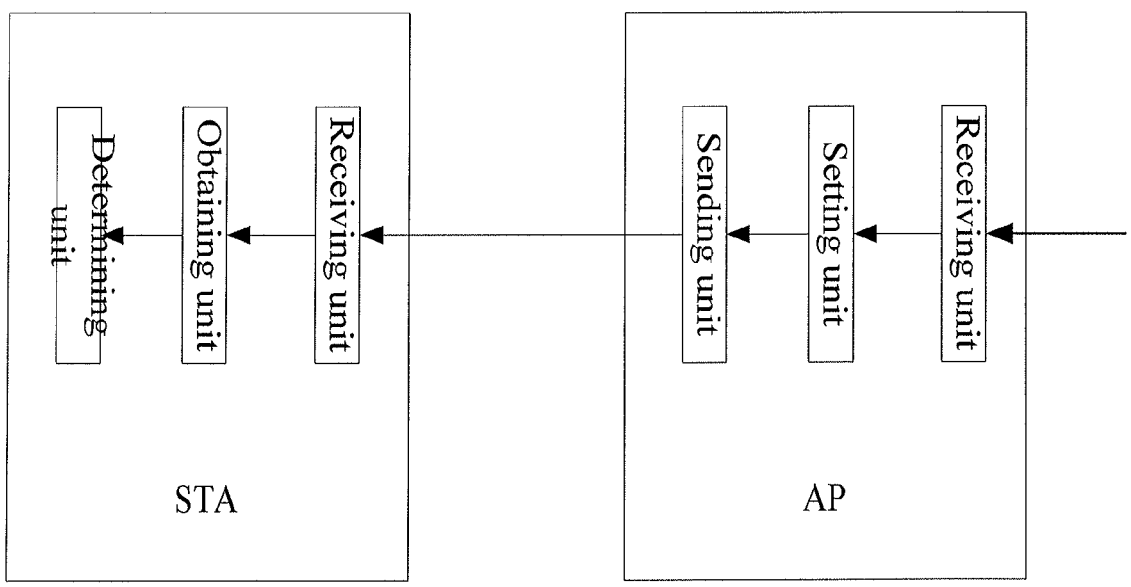
FIG. 6 shows a system for determining the existence of broadcast/multicast frames buffered in an AP according to an embodiment of the present disclosure.

As shown in FIG. 6, a system for determining whether there are broadcast/multicast frames buffered in an AP includes an AP and a STA.

The STA is configured to obtain an index value of the associated SSID and/or multicast group, with the index value associating the broadcast/multicast indication bit in the Beacon frame, receive the Beacon frame from the AP, and determine whether there are broadcast/multicast frames buffered in the AP according to the index value of the associated SSID and/or multicast group and the broadcast/multicast indication bit of the Beacon frame.

The AP is configured to, when receiving broadcast/multicast frames from the service network and/or multicast group, set the broadcast/multicast indication bit that associates the SSID and/or multicast group in the Beacon frame to the valid state and send the Beacon frame to the STA.

A STA provided in an embodiment of the present disclosure includes: a receiving unit, an obtaining unit, and a determining unit. The receiving unit is configured to receive the Beacon frame from the AP. The obtaining unit is configured to obtain the index value of the associated SSID and/or multicast group, with the index value associating the broadcast/multicast indication bit in the Beacon frame. The determining unit is configured to determine whether there are broadcast/multicast frames buffered in an AP according to the index value of associated SSID and/or multicast group and the broadcast/multicast indication bit of the Beacon.

An AP provided in an embodiment of the present disclosure includes: a receiving unit, a setting unit, and a sending unit. The receiving unit is configured to receive broadcast/multicast frames sent by the SSID and/or multicast group and start a setting unit. The setting unit is configured to set the broadcast/multicast indication bit that associates the SSID and/or multicast to the valid state. The sending unit is configured to send the Beacon frame set by the setting unit to the STA.

A system for receiving broadcast/multicast frames buffered in an AP in an embodiment of the present disclosure includes: a STA and an AP. The STA is configured to obtain an index value of the associated SSID and/or multicast group, with the index value associating the broadcast/multicast indication bit in the Beacon frame, receive the Beacon frame from the AP, wake up according to the index value of the associated SSID and/or multicast group, the broadcast/multicast indication bit in the Beacon frame and DTIM time, and receive the broadcast/multicast frames buffered in the AP. The AP, when receiving broadcast/multicast frames from the SSID and/or multicast group, is configured to set the broadcast/multicast indication bit that associates the SSID and/or multicast group to the valid state, set a DTIM time that associates the SSID and/or multicast group in the Beacon frame according to the received broadcast/multicast frames, and send the Beacon frame to the STA.

To ensure that an embodiment of the present disclosure is applicable to the case in which an AP is shared by using the virtual AP technology and multiple-SSIDs technology, the AP may set a shared indication bit to indicate whether the AP is shared by using the virtual AP method or multiple-SSIDs method. The STA may determine which method is used to read the indication about the buffered broadcast/multicast frames according to the indication bit. The indication bit may be set in the Beacon frame, for example, in the interworking capability domain of the Beacon frame. The interworking capability domain occupies two bytes, three bits (bit 0, bit 1 and bit 2) of which are used and other bits are unused. In this case, any of the other bits may be used to identify whether the AP adopts the virtual AP method or multiple-SSIDs method. The shared indication bit may be used in other messages, such as associated response message in step 410, or be set by extending a message, for example, adding an information domain to the Beacon frame. In this case, any bit in the added information domain may be used to identify whether the AP adopts the virtual AP method or multiple-SSIDs method.

It is understood that the broadcast/multicast indication bit and/or DTIM time may be set in a frame other than the Beacon frame or by extending a new message.

Besides, when some STAs in a multicast group or a service network are in the PS state and some are in the operating state, the AP sends and buffers the broadcast/multicast frame received from the service network or multicast group. At the same time, the AP sets the broadcast/multicast indication bit that associates the service network or multicast group to the valid state and sends the frames carrying the broadcast/multicast indication bit to a STA so that the STA in the PS state can receive the buffered broadcast/multicast frame. The STA determines whether there are broadcast/multicast frames buffered in the AP according to the associated service network and/or multicast group and the received broadcast/multicast indication bit.

Although the disclosure has been described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

We claim:

1. A method for transmitting a frame in a wireless local area Network (WLAN), the method comprising:
   in an access point (AP) shared by multiple virtual APs wherein each of the multiple virtual APs is associated with one of multiple Basic Service Set Identities (BSSIDs), or, the AP is associated with the multiple BSSIDs:
   setting, by the AP, an element corresponding to each of the multiple BSSIDs and a Partial Virtual Bitmap in a Beacon frame;
   wherein the Partial Virtual Bitmap includes a plurality of broadcast/multicast indication bits, each broadcast/multicast indication bit corresponding to a respective BSSID of the multiple BSSIDs, and each broadcast/multicast indication bit is used to indicate whether there is a group addressed broadcast/multicast frame buffered in the AP for a Station (STA), which is associated with the respective BSSID of the multiple BSSIDs; and
   wherein an element in the beacon frame includes an index field and a delivery traffic indication message (DTIM) Count field, the index field is configured to identify a BSSID among the multiple BSSIDs, the DTIM Count field is associated with the BSSID identified by the index field, and the DTIM Count field is configured to notify the STA whether the Beacon frame is a DTIM Beacon, which is used to notify the STA when to wake up to receive the buffered broadcast/multicast frame; and
   sending out the Beacon frame.

2. The method according to claim 1, wherein the method further comprises:
   receiving, by the AP, a request message for querying an SSID list from the STA;
   sending, by the AP, a response message carrying the SSID list in the AP.

3. The method according to claim 1, wherein the element including the index field and the DTIM Count field further includes an Element ID field, a Length field, and a DTIM Period field.

4. A method for receiving a frame in a WLAN, the method comprising:
   in a WLAN wherein an access point (AP) is shared by multiple virtual APs, each of the multiple virtual APs is associated with one of multiple Basic Service Set Identities (BSSIDs), or, the AP is associated with the multiple BSSIDs:
   obtaining, by a Station (STA), a Beacon frame sent by the AP, the Beacon frame including an element corresponding to each of the multiple BSSIDs and a Partial Virtual Bitmap;
   wherein the Partial Virtual Bitmap includes a plurality of broadcast/multicast indication bits, each broadcast/multicast indication bit corresponding to a respective BSSID of the multiple BSSIDs, and each broadcast/multicast indication bit is used to indicate whether there is a group addressed broadcast/multicast frame buffered in the AP for a Station (STA) associated with the respective BSSID of the multiple BSSIDs; and
   wherein an element in the beacon frame includes an index field and a delivery traffic indication message (DTIM) Count field, the index field is configured to identify a BSSID among the multiple BSSIDs, the DTIM Count field is associated with the BSSID identified by the index field, and the DTIM Count field is configured to notify the STA whether the Beacon frame is a DTIM Beacon, which is used to notify the STA when to wake up to receive the buffered broadcast/multicast frame; and
   determining by the STA, according to Beacon frame whether there is a broadcast/multicast frame associated with the STA buffered in the AP and when to wake up to receive the buffered broadcast/multicast frame.

5. The method according to claim 4, wherein the method further comprises:
   sending, by the STA, a query request message for querying an SSID list to the AP;
   receiving, by the STA, a response message carrying the SSID list from the AP;
   selecting an SSID from the SSID list for association and recording, by the STA, an index value (BSSID) corresponding to the SSID;
   wherein the determining by the STA, according to Beacon frame comprises:
   according to the broadcast/multicast indication bit corresponding to the record index value (BSSID), determining whether there is a broadcast/multicast (group addressed) frame buffered in the AP for the Station (STA); and
   according to the DTIM Count field and a DTIM Period field that are associated with the record index value (BSSID) in the element, determining when to wake up to receive the buffered broadcast/multicast frame.

6. The method according to claim 4, wherein the element including the index field and the DTIM Count field further includes an Element ID field, a Length field, and a DTIM Period field.

7. An Access Point (AP) in a WLAN, wherein the AP is shared by multiple virtual APs, wherein each of the multiple virtual APs is associated with one of multiple Basic Service Set Identities (BSSIDs), or, the AP is associated with the multiple BSSIDs, the AP comprising:
   a setting unit, configured to, set an element corresponding to each of the multiple BSSIDs and a Partial Virtual Bitmap in a Beacon frame;
   wherein the Partial Virtual Bitmap includes a plurality of broadcast/multicast indication bits, each broadcast/multicast indication bit corresponding to a respective BSSID of the multiple BSSIDs, and each broadcast/multicast indication bit is used to indicate whether there is a group addressed broadcast/multicast frame buffered in the AP for a Station (STA) associated with the respective BSSID of the multiple BSSIDs; and
   the element includes an index field and a delivery traffic indication message (DTIM) Count field, the index field is configured to identify a BSSID among the multiple BSSIDs, the DTIM Count field is associated with the BSSID identified by the index field, and the DTIM Count field is configured to notify the STA whether the Beacon frame is a DTIM Beacon, which is used to notify the STA when to wake up to receive the buffered broadcast/multicast frame; and
   a transceiver, configured to, send out the Beacon frame.

8. The Access Point (AP) according to claim 7, the transceiver is further configured to receive a request message for querying an SSID list from the STA and send a response message carrying an SSID list in the AP.

9. The method according to claim 7, wherein the element further includes an Element ID field, a Length field, and a DTIM Period field.

10. A Station (STA) in a WLAN, wherein in the WLAN, an Access Point (AP) is shared by multiple virtual APs, each of the multiple virtual APs is associated with one of multiple Basic Service Set Identities (BSSIDs), or, the AP is associated with the multiple BSSIDs, the STA comprising:
    a transceiver, configured to receive a Beacon frame sent by the AP, the Beacon frame includes an element corresponding to each of the multiple BSSIDs and a Partial Virtual Bitmap;
    wherein the Partial Virtual Bitmap includes a plurality of broadcast/multicast indication bits, each broadcast/multicast indication bit corresponding to a respective BSSID of the multiple BSSIDs, and each broadcast/multicast indication bit is used to indicate whether there is a group addressed broadcast/multicast frame buffered in the AP for a Station (STA) associated with the respective BSSID of the multiple BSSIDs; and
    an element in the beacon frame includes an index field and a delivery traffic indication message (DTIM) Count field, the index field is configured to identify a BSSID among the multiple BSSIDs, the DTIM Count field is associated with the BSSID identified by the index field, and the DTIM Count field is configured to notify the STA whether the Beacon frame is a DTIM Beacon, which is used to notify the STA when to wake up to receive the buffered broadcast/multicast frame; and
    a determining unit, configured to determine, according to the received Beacon frame, whether there is a broadcast/multicast frame associated with the STA buffered in the AP, and when to wake up to receive the buffered broadcast/multicast frame.

11. The STA according to the claim 10, wherein
    the transceiver is further configured to send a request message for querying an SSID list to the AP and receive a response message carrying the SSID list from the AP;
    the STA is configured to select an SSID from the SSID list for association and record an index value (BSSID) corresponding to the SSID, according to the broadcast/multicast indication bit that is associated with the recorded index value (BSSID), determine whether there is a group addressed broadcast/multicast frame buffered in the AP for the STA; and according to the DTIM Count field and a DTIM Period field that are associated with the recorded index value, determine when to wake up to receive the buffered broadcast/multicast frame.

12. The method according to claim 10, wherein the element including the index field and the DTIM Count field further includes an Element ID field, a Length field, and a DTIM Period field.

* * * * *